United States Patent
Strauss et al.

[11] Patent Number: 5,940,598
[45] Date of Patent: Aug. 17, 1999

[54] TELECOMMUNICATIONS NETWORK TO INTERNETWORK UNIVERSAL SERVER

[75] Inventors: Michael J. Strauss, Potomac, Md.; Robert D. Farris, Sterling, Va.

[73] Assignee: Bell Atlantic Network Services, Inc., Arlington, Va.

[21] Appl. No.: 08/789,809

[22] Filed: Jan. 28, 1997

[51] Int. Cl.$^6$ .................................................. H04L 12/46
[52] U.S. Cl. .............................. 395/200.79; 395/200.8; 370/466
[58] Field of Search ........................ 395/200.58, 200.6, 395/200.66, 200.76, 200.8, 200.57, 200.79; 370/466, 467, 401

[56] References Cited

U.S. PATENT DOCUMENTS

| | | | |
|---|---|---|---|
| 5,377,191 | 12/1994 | Farrell et al. | 370/401 |
| 5,406,557 | 4/1995 | Baudoin | 395/407 |
| 5,608,786 | 3/1997 | Gordon | 370/352 |
| 5,680,552 | 10/1997 | Netravali et al. | 395/200.8 |
| 5,724,355 | 3/1998 | Bruno et al. | 370/466 |
| 5,726,984 | 3/1998 | Kubler et al. | 370/349 |
| 5,790,809 | 8/1998 | Homles | 395/200.6 |
| 5,794,039 | 8/1998 | Guck | 395/200.33 |

OTHER PUBLICATIONS

Theodore S. Rappaport, Wireless Communications, Prentice Hall, pp. 449–450, 463–464, 469, Jan. 1996.

*Primary Examiner*—Zarni Maung
*Assistant Examiner*—Patrice L. Winder
*Attorney, Agent, or Firm*—McDermott, Will & Emery

[57] ABSTRACT

A universal or multi-purpose network server having enhanced processing functions which are performed in association with a telecommunicatons network to provide multi-mode communications via a combination of the public switched telephone network (PSTN) and a public packet data network, such as the Internet. The improved network server includes a multiplicity of application processing units optimized for the processing of specific signal types. The type of signals being handled by the server is ascertained by means of a passive monitor and each type of signal is switched to an application processor on the basis of the signal type identified by the passive monitor. The processor places the processed signal in the protocol of the public packet data network and delivers that signal to a router connected to the public packet data network. Provision is made for establishing the availability of a called party through a control network before establishing an end to end communication link.

33 Claims, 8 Drawing Sheets

TELECOMMUNICATIONS NETWORK TO INTERNETWORK UNIVERSAL SERVER

TECHNICAL FIELD

This invention relates to a universal or multipurpose network server having enhanced processing functions which are performed in association with a telecommunications network to provide multi-mode communications via a combination of the public switched telephone network (PSTN) and a public packet data network, such as the Internet.

ACRONYMS

The written description uses a large number of acronyms to refer to various services and system components. Although known, use of several of these acronyms is not strictly standardized in the art. For purposes of this discussion, acronyms therefore will be defined as follows:

Address Resolution Protocol (ARP)
Advanced Intelligent Network (AIN)
Application Processing Units (APUS)
Asynchronous Transfer Mode (ATM)
Autonomous Systems (AS)
Common Channel Interoffice Switching (CCIS)
Digital Service Level 1 (DS1)
Facsimile (FAX)
International Standards Organization (ISO)
Internet Control Message Protocol (ICMP)
Internet Protocol (IP)
Internet Service Providers (ISPs)
Local Area Networks (LANs)
Military Network (MILNET)
Media Access Control (MAC)
Multiplexer/Demultiplexer (MUX/DEMUX)
National Science Foundation NETwork (NSFNET)
Open Systems Interconnection (OSI)
Public Switched Telephone Network (PSTN)
Serial Line Interface Protocol (SLIP)
Service Control Point (SCP)
Service Switching Point (SSP)
Service Transfer Point (STP)
Simplified Message Desk Interface (SMDI)
Switched Multimegabit Data Service (SMDS)
Switching System 7 (SS7)
Synchronous Digital Hierarchy (SDH)
Synchronous Optical Network (SONET)
Transactional Capabilities Application Part (TCAP)
Transmission Control Protocol (TCP)

BACKGROUND ART

Attention recently has been directed to implementing a variety of communication services, including voice telephone service, data service, facsimile (FAX) service, video/audio service, etc., over the worldwide packet data network now commonly known as the Internet. The Internet had its genesis in U.S. Government programs funded by the Advanced Research Projects Agency (ARPA). That research made possible national internetworked data communication systems. This work resulted in the development of network standards as well as a set of conventions, known as protocols, for interconnecting data networks and routing information across the networks. These protocols are commonly referred to as TCP/IP. The TCP/IP protocols were originally developed for use only through ARPANET but have subsequently become widely used in the industry. TCP/IP is flexible and robust. TCP takes care of the integrity, and IP moves the data.

Internet provides two broad types of services: connectionless packet delivery service and reliable stream transport service. The Internet basically comprises several large computer networks joined together over high-speed data links ranging from ISDN to T1, T3, FDDI, SONET, SMDS, ATM, OT1, etc. The most prominent of these national nets are MILNET (Military Network), NSFNET (National Science Foundation NETwork), and CREN (Corporation for Research and Educational Networking) In 1995, the Government Accounting Office (GAO) reported that the Internet linked 59,000 networks, 2.2 million computers and 15 million users in 92 countries. However, since then it is estimated that the number of Internet users continues to double approximately annually.

In simplified fashion the Internet may be viewed as a series of packet data switches or 'routers' connected together with computers connected to the routers. The Information Providers (IPs) constitute the end systems which collect and market the information through their own servers. Access providers are companies such as UUNET, PSI, MCI and SPRINT which transport the information. Such companies market the usage of their networks.

FIG. 1 shows a simplified diagram of the Internet and various types of systems typically connected thereto. Generally speaking the Internet consists of Autonomous Systems (AS) type packet data networks which may be owned and operated by Internet Service Providers (ISPs) such as PSI, UUNET, MCI, SPRINT, etc. Three such AS/ISPs appear in FIG. 1 at 352, 354 and 356. The Autonomous Systems (ASs) are linked by Inter-AS Connections 358, 360 and 362. Information Providers (IPs) 366 and 372, such as America Online (AOL) and Compuserve, connect to the Internet via high speed lines 370 and 374, such as T1/T3 and the like. Information Providers generally do not have their own Internet based Autonomous Systems but have or use Dial-Up Networks such as SprintNet (X.25), DATAPAC and TYMNET.

By way of current illustration, MCI is both an ISP and an IP, SPRINT is an ISP, and the MicroSoft Network (MSN) is an IP using UUNET as an ISP. Other information providers, such as universities, are indicated in exemplary fashion at 364 and are connected to the AS/ISPs via the same type connections here illustrated as T1 lines 368. Corporate Local Area Networks (LANs), such as those illustrated in 380 and 378, are connected through routers 380 and 382 and high speed data links such as T1 lines 384 and 386. Laptop computers 388 and 390 are representative of computers connected to the Internet via the public switched telephone network (PSTN) and are shown connected to the AS/ISPs via dial up links 386 and 396.

As data communication networks have developed, various approaches have been used in the choice of communication medium, network topology, message format, protocols for channel access, and so forth. Some of these approaches have emerged as de facto standards, but there is still no single standard for network communication. However, a model for network architectures has been proposed and widely accepted. It is known as the International Standards Organization (ISO) Open Systems Interconnection (OSI) reference model. The OSI reference model is not itself a network architecture. Rather it specifies a hierarchy of protocol layers and defines the function of each layer in the network. Each layer in one computer of the network carries on a conversation with the corresponding layer in another computer with which communication is taking place, in accordance with a protocol defining the rules of this communication. In reality, information is transferred down from layer to layer in one computer, then through the channel medium and back up the successive layers of the other computer. However, for purposes of design of the various layers and understanding their functions, it is easier to consider each of the layers as communicating with its counterpart at the same level, in a "horizontal" direction.

The lowest layer defined by the OSI model is called the physical layer, and is concerned with transmitting raw data bits over the communication channel. Design of the physical layer involves issues of electrical, mechanical or optical engineering, depending on the medium used for the communication channel. The layer next to the physical layer is called the data link layer. The main task of the data link layer is to transform the physical layer, which interfaces directly with the channel medium, into a communication link that appears error-free to the next layer above, known as the network layer. The data link layer performs such functions as structuring data into packets or frames, and attaching control information to the packets or frames, such as checksums for error detection, and packet numbers.

Although the data link layer is primarily independent of the nature of the physical transmission medium, certain aspects of the data link layer function are more dependent on the transmission medium. For this reason, the data link layer in some network architectures is divided into two sublayers: a logical link control sublayer, which performs all medium-independent functions of the data link layer, and a media access control (MAC) sublayer. This sublayer determines which station should get access to the communication channel when there are conflicting requests for access. The functions of the MAC layer are more likely to be dependent on the nature of the transmission medium.

The Internet protocols generally referred to as TCP/IP were originally developed for use only through Arpanet and have subsequently become widely used in the industry. The protocols provide a set of services that permit users to communicate with each other across the entire Internet. The specific services that these protocols provide are not important to the present invention, but include file transfer, remote log-in, remote execution, remote printing, computer mail, and access to network file systems.

The basic function of the Transmission Control Protocol (TCP) is to make sure that commands and messages from an application protocol, such as computer mail, are sent to their desired destinations. TCP keeps track of what is sent, and retransmits anything that does not get to its destination correctly. If any message is too long to be sent as one "datagram," TCP will split it into multiple datagrams and makes sure that they all arrive correctly and are reassembled for the application program at the receiving end. Since these functions are needed for many applications, they are collected into a separate protocol (TCP) rather than being part of each application. TCP is implemented in the transport layer of the OSI reference model.

The Internet Protocol (IP) is implemented in the network layer of the OSI reference model, and provides a basic service to TCP: delivering datagrams to their destinations. TCP simply hands IP a datagram with an intended destination; IP is unaware of any relationship between successive datagrams, and merely handles routing of each datagram to its destination. If the destination is a station connected to a different LAN, the IP makes use of routers to forward the message.

TCP/IP frequently uses a slight deviation from the seven-layer OSI model in that it may have five layers. These five layers are combinations and derivatives of the seven-layer model as shown in FIG. 2. The five layers are as follows:

Layer 5—The Application Layer. Applications such as ftp, telnet, SMTP, and NFS relate to this layer.

Layer 4—The Transport Layer. In this layer, TCP and UDP add transport data to the packet and pass it to layer 3.

Layer 3—The Internet Layer. When an action is initiated on a local host (or initiating host) that is to be performed or responded to on a remote host (or receiving host), this layer takes the package from layer 4 and adds IP information before passing it to layer 2.

Layer 2—The Network Interface Layer. This is the network device as the host, or local computer, sees it and it is through this medium that the data is passed to layer 1.

Layer 1—The Physical Layer. This is literally the Ethernet or Serial Line Interface Protocol (SLIP) itself.

At the receiving host the layers are stripped one at a time, and their information is passed to the next highest level until it again reaches the application level. If a gateway exists between the initiating and receiving hosts, the gateway takes the packet from the physical layer, passes it through a data link to the IP physical layer to continue, as is shown in FIG. 3. As a message is sent from the first host to the second, gateways pass the packet along by stripping off lower layers, readdressing the lower layer, and then passing the packet toward its final destination.

A router, like a bridge, is a device connected to two or more LANs. Unlike a bridge, however, a router operates at the network layer level, instead of the data link layer level. Addressing at the network layer level makes use of a 32-bit address field for each host, and the address field includes a unique network identifier and a host identifier within the network. Routers make use of the destination network identifier in a message to determine an optimum path from the source network to the destination network. Various routing algorithms may be used by routers to determine the optimum paths. Typically, routers exchange information about the identities of the networks to which they are connected.

When a message reaches its destination network, a data link layer address is needed to complete forwarding to the destination host. Data link layer addresses are 48 bits long and are globally unique, i.e., no two hosts, wherever located, have the same data link layer address. There is a protocol called ARP (address resolution protocol), which obtains a data link layer address from the corresponding network layer address (the address that IP uses). Typically, each router maintains a database table from which it can look up the data link layer address, but if a destination host is not in this ARP database, the router can transmit an ARP request. This message basically means: "will the host with the following network layer address please supply its data link layer address." Only the addressed destination host responds, and the router is then able to insert the correct data link layer address into the message being forwarded, and to transmit the message to its final destination.

IP routing specifies that IP datagrams travel through internetworks one hop at a time (next hop routing) based on the destination address in the IP header. The entire route is not known at the outset of the journey. Instead, at each stop, the next destination (or next hop) is calculated by matching the destination address within the datagram's IP header with an entry in the current node's (typically but not always a router) routing table.

Each node's involvement in the routing process consists only of forwarding packets based on internal information resident in the router, regardless of whether the packets get to their final destination. To extend this explanation a step further, IP routing does not alter the original datagram. In particular, the datagram source and destination addresses remain unaltered. The IP header always specifies the IP address of the original source and the IP address of the ultimate destination.

When IP executes the routing algorithm it computes a new address, the IP address of the machine/router to which the datagram should be sent next. This algorithm uses the information from the routing table entries, as well as any cached information local to the router. This new address is most likely the address of another router/gateway. If the datagram can be delivered directly (the destination network is directly attached to the current host) the new address will be the same as the destination address in the IP header.

The next hop address defined by the method above is not stored in their IP datagram. There is no reserved space to hold it and it is not "stored" at all. After executing the routing algorithm (the algorithm is specific to the vendor/ platform) to define the next hop address to the final destination. The IP protocol software passes the datagram and the next hop address to the network interface software responsible for the physical network over which the datagram must now be sent.

The network interface software binds the next hop address to a physical address (this physical address is discovered via address resolution protocols (ARP, RARP, etc.), forms a frame (Ethernet, SMDS, FDDI, etc.—OSI layer 2 physical address) using the physical address, places the datagram in the data portion of the frame, and sends the result out over the physical network interface through which the next hop gateway is reached. The next gateway receives the datagram and the foregoing process is repeated.

In addition, the IP does not provide for error reporting back to the source when routing anomalies occur. This task is left to another Internet protocol, the Internet Control Message Protocol (ICMP).

A router will perform protocol translation. One example is at layers 1 and 2. If the datagram arrives via an Ethernet interface and is destined to exit on a serial line, for example, the router will strip off the Ethernet header and trailer, and substitute the appropriate header and trailer for the specific network media, such as SMDS, by way of example.

A route policy may be used instead of routing table entries to derive the next hop address. In the system and methodology of the present invention, the source address is tested to see in which ISP address range it falls. Once the ISP address range is determined the packet is then routed to the next hop address associated with the specific ISP.

Data communications network services have two categories of call establishment procedures: connection-oriented and connectionless.

Connection-oriented network services require that users establish a single distinct virtual circuit before the data can be transmitted. This circuit then defines a fixed path through the network that all traffic follows during the session. Several packet switching services are connection-oriented, notably X.25 and Frame Relay. X.25 is the slower of the services, but has built-in error correction—enough for its performance not to depend on clean, high-quality optical fiber lines. Frame relay, regarded as the first generation of fast packet technology, is well-suited for high-speed bursty data communication applications.

Connectionless network services, by contrast, let each packet of a communications session take a different, independent path through the network. One example is the Switched Multimegabit Data Service (SMDS), a possible precursor to broadband ISDN. This fast-packet service supports data rates ranging from the T1 rate of 1.544 Mb/s up to 1 Gb/s. The SMDS transport system architecture is defined by IEEE 802.6 Metropolitan Area Network standards.

Eventually, SMDS is expected to operate at rates of 51.85 Mb/s to 9.953 Gb/s specified by the family of standards known in North America as Synchronous Optical Network (SONET). Synchronous Digital Hierarchy (SDH) is an ITU recommendation that grew out of and includes the specifications of SONET.

The process of routing packets over the Internet is also considered a connectionless network service. The Internet Protocol (IP) addresses packets from sender to receiver. It is still used mostly in conjunction with the Transmission Control Protocol (TCP), which establishes a connection between end users to manage the traffic flow and ensures the data are correct, providing end-to-end reliability. The combination, known as TCP/IP, is the Internet's main backbone protocol suite.

Asynchronous transfer mode (ATM) is a connection-oriented network service. It is a high-bandwidth, fast-packet switching and multiplexing technique that segments packets into 53-byte cells. It supports sound (voice and audio), data, documents (text, graphics and still images), and video (moving pictures with sound). ATM and SDH/SONET are key technologies enabling broadband ISDN.

The Problem

The processing of the various types of signaling which it is desired to transport over a combined telecommunications and packet data internetwork involves a multitude of considerations related to the differing characteristics of the signals which are involved. Thus analog voiceband channels (4 kHZ nominal) must be digitized by the codec (coder/ decoder) to create 64 Kbps DS level 0 (DS0) signals. Twenty-four of these DS0 channels from the codecs must be multiplexed by a channel bank to create 1.544 DS1 channels. These DS1 channels are then digitally switched through the telecommunications network, and delivered to a server device for further processing for delivery to the packet internetwork or Internet. This further processing involves compression, packetizing and addressing, and routing onto the internetwork. The nature of this processing is dependent on the characteristics of the voice signal and the nature of the intelligence to be conveyed.

Data modems are also analog information sources, since the modem prepares digital information for transmission over analog circuits designed for voice. This analog consideration in addition to the nature of the data to be transported influences the processing which must occur for satisfactory transport over the combined networks.

Video services pose even more stringent requirements than those associated with voice and data telephony. The older services, such as video telephone and conferencing, require increased compression of the bit rate for even limited-motion, full-color, and limited-resolution video which may be attained at a 64 kbps DS0 or B-channel rate.

Recent expansion of proposed video services to include television and inter-active television entail still additional processing stratagems, as may be seen, for example, in the descriptions of such patents as U.S. Pat. No. 5,384,835, issued Jan. 24, 1995, to Barbara L. Wheeler, et al., U.S. Pat. No. 5,410,343, issued Apr. 25, 1995, to Carl D. Coddington, et al., U.S. Pat. No. 5,477,263, issued Dec. 19, 1995, to Daniel O'Callaghan, et al.

To the extent that the prior art has addressed transportation of these varied types of services over the internetwork known as the Internet, and to the extent that the approach has involved utilization of the public switched telephone network to implement such services, diverse devices have been proposed tailored to the particular service involved.

As use of the Internet expands, particularly for transport of voice telephone communications in addition to varied types of data services, a need exists for enhanced interconnection of the public switched telephone network and the public packet data network that will facilitate delivery of such services.

DISCLOSURE OF THE INVENTION

The present invention addresses the above stated needs by providing a universal or multi-purpose network server having enhanced processing functions which are performed in association with a telecommunications network to provide multi-mode communications via a combination of the public switched telephone network (PSTN) and a public packet data network, such as the Internet.

It is an object of the invention to provide such a multi-purpose server using readily available components adapted to be used in a telecommunications environment.

The server of the invention is adapted to be connected between a terminating central office of a switched telephone network, such as the public switched telephone network (PSTN) and an internetwork router, such as the routers of Internet Service Providers (ISPs), used to access the Internet.

The central office contains a program controlled switching system with service switching point (SSP) capability. The central office is connected to a common channel interoffice switching (CCIS) network. The CCIS network is preferably a Switching System 7 (SS7) network of the Advanced Intelligent Network (AIN) type. A series of subscribers are connected to the central office. The subscribers may comprise a POTS (plain old telephone service) subscriber having a POTS telephone, a facsimile (FAX) subscriber, a subscriber having a personal computer (PC) with a modem, a video service subscriber, and varied other type subscribers. The links to the subscribers may be copper twisted pair, ISDN, T1 or the like. The central office may be connected by a T1 line to the input/output of the network server.

The network server input/output interface to the telephone network may include a multiplexer/demultiplexer (MUX/DEMUX) which receives a 1.54 Mbps DS1 (digital service level 1) input on the T1 line from the central office. The MUX/DEMUX demodulates or separates out the 24 64 Kbps DS0 signals which were in its DS1 input, and passes these DS0 signals on to the digital switch. The lines which carry these DS0 signals pass through or are coupled to a passive monitor or sampler. The monitor or sampler is capable of passively monitoring and reading or identifying the signals on the DS0 lines. The network server is provided with a master control unit (MCU) or central processor which is connected to the digital switch and to a LAN (local area network) in the network server. The local area network may be of any suitable type, such as an Ethernet. The central office may have an SMDI (Simplified Message Desk Interface) card which is connected to an SMDI card in the network server in order to provide a signaling link. Alternatively the server may be provided with SSP capability and be connected to the SSP capable central office through one or more STPs. If an SMDI signaling link is used, the SMDI card in the network server is connected to the LAN in the server.

The network server is provided with application processing units (APUs) which are each individually designed to process the distinctive form of signal which is delivered to the specific APU or processor. By way of example the APUs may be designed for processing voice, data, FAX, video, and other forms of signals. The APUs are connected to the LAN and are also connected to the digital switch by DS0 64 Kbps input lines and by separate output lines. Each APU may be provided with internal buffering storage and the network server may have a common storage which is connected to the LAN.

The signals on the output lines of the APUs are preferably in TCP/IP protocol as presently will be explained. The digital switch is further connected to one or more Internet Service Provider (ISP) routers. The ISP routers in turn are connected to the public data internetwork or Internet.

In operation the process begins when a call commences. The call may be originated by dialing a preassigned 800 number such as 1-800-INTERNET. This results in TCAP (Transactional Capabilities Application Part) messages in the common channel signaling network in the conventional manner, and the actual number of the appropriate network server is ascertained and connected to the originating central office. It will be understood that there may be multiple network servers geographically dispersed. The 800 number can be usable nationwide to locate the cognizant network server in a manner which is known to those skilled in the art.

The monitor or sampler analyzes the call to determine its nature. If it is determined that the signal in the line to the digital switch is a voice signal, the monitor or sampler communicates this fact to the digital switch via the LAN. The switch in turn routes the signal to the input line of the voice processor APU. The voice APU thereupon applies appropriate voice processing to the signal. This may comprise compression, packetizing, and encapsulating in TCP/IP protocol addressing. The voice APU then forwards the TCP/IP signal over the APU output line back to the digital switch. The switch recognizes the addressing and sends the packetized TCP/IP signal to the designated ISP router. Alternatively the digital switch may receive handling instructions via the LAN. The ISP router performs its customary addressing and routing functions and sends the packet out into the Internet on its first hop. In this procedure the voice signal is processed in the application processing unit APU which is specifically designed to provide optimum handling to voice signals.

If the analysis by the monitor resulted in a determination that the monitored signal is a facsimile or FAX signal, the DS0 signal is sent by the digital switch to the FAX application processor unit. The FAX APU processes the signal to translate the DS0 signal back to the original FAX protocol. Thus the FAX APU packetizes, encapsulates, and addresses the FAX signals in TCP/IP protocol. The FAX APU then forwards the TCP/IP signal over the FAX APU output line back to the digital switch. The switch recognizes the addressing and sends the packetized TCP/IP signal to the designated ISP router. The router performs its customary addressing and routing functions and sends the packet out into the Internet on its first hop. In this procedure the FAX signal is processed in the application processing unit APU which is specifically designed to provide optimum handling to FAX signals.

If the analysis in the monitor resulted in a determination that the signal was a video signal, the DS0 signal is sent by the digital switch to the video application processor unit. The video APU processes the signal to translate the DS0 signal back to the original MPEG. The video APU then packetizes, encapsulates, and addresses the MPEG signals in TCP/IP protocol. The video APU forwards the TCP/IP signal over its output line back to the digital switch. The switch recognizes the addressing and sends the packetized TCP/IP signal to the designated ISP router. The router performs its customary addressing and routing functions and sends the packet out into the Internet on its first hop. In this procedure the voice signal is processed in the application processing unit APU which is specifically designed to provide optimum handling to video signals.

If the analysis by the monitor indicates that the signal is a data signal, the DS0 signal is sent by the digital switch to the data application processor unit or APU. The data APU then processes the signal to translate the DS0 signal back to the original data signal. The data APU packetizes, encapsulates, and addresses the data signals in TCP/IP protocol. The data APU then forwards the TCP/IP signal over its output line back to the digital switch. The switch recognizes the addressing and sends the packetized TCP/IP signal to the designated ISP router. The router performs its customary addressing and routing functions and sends the packet out into the Internet on its first hop. In this procedure the voice signal is processed in the application processing unit APU which is specifically designed to provide optimum handling to data signals.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DESCRIPTION OF THE PREFERRED EMBODIMENT

Figure 1:
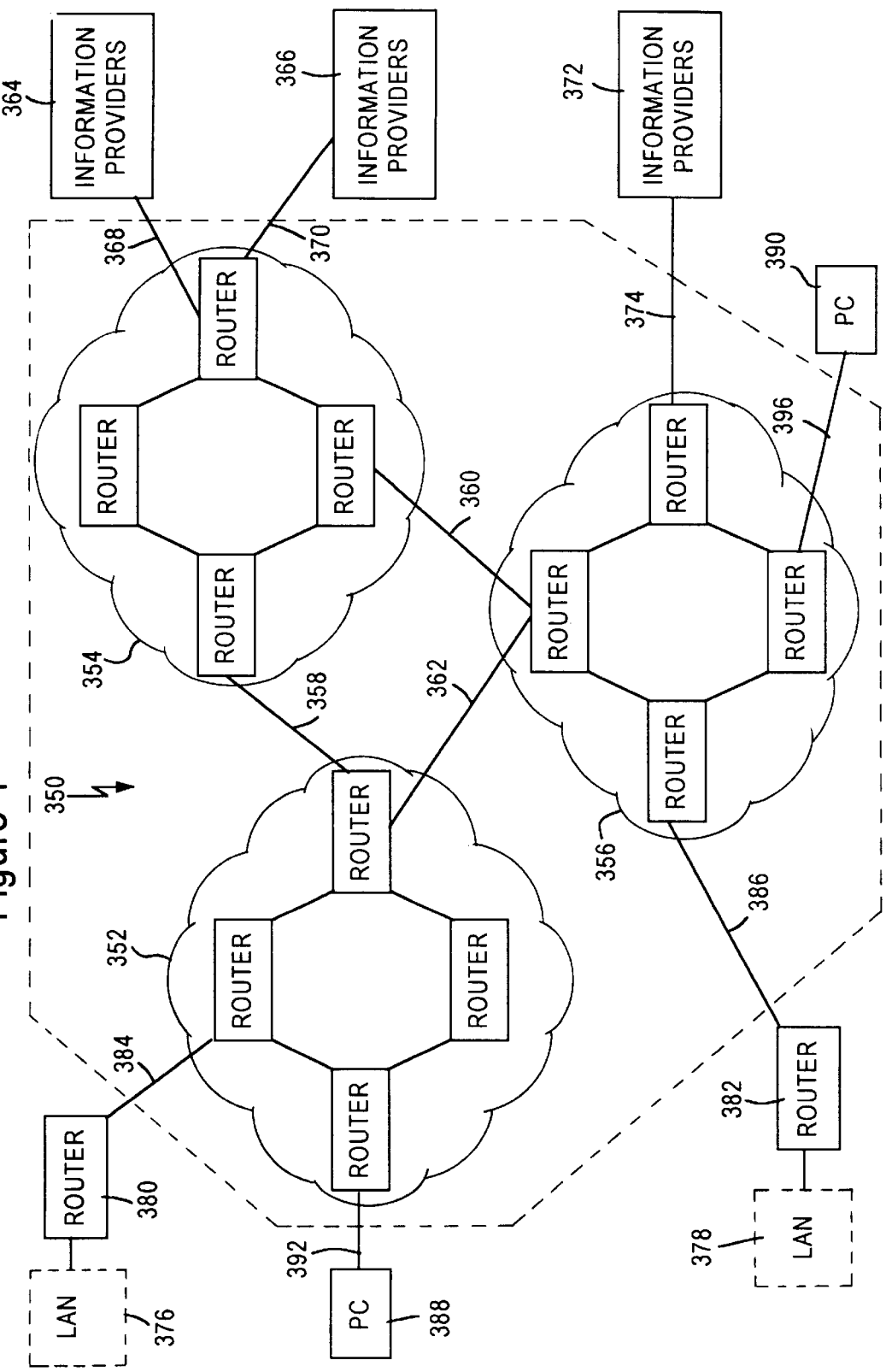
FIG. 1 is a simplified diagram of the Internet.
Figure 2:
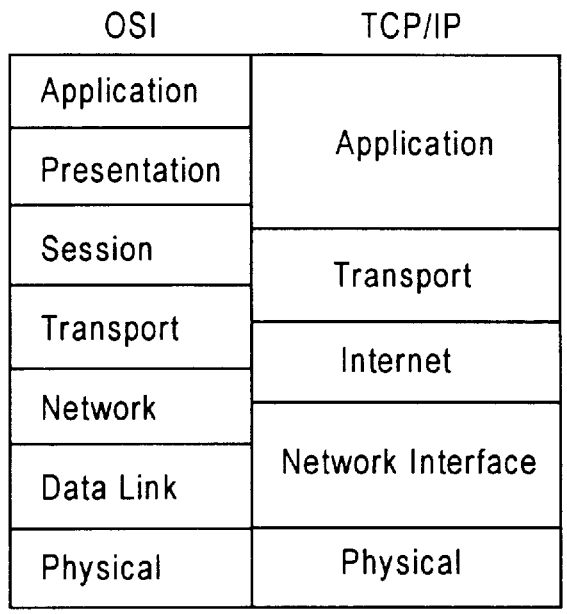
FIG. 2 is a comparative diagram of the International Standards Organization (ISO) Open System Interconnection (OSI) model for network architectures and a commonly used TCP/IP model.
Figure 3:
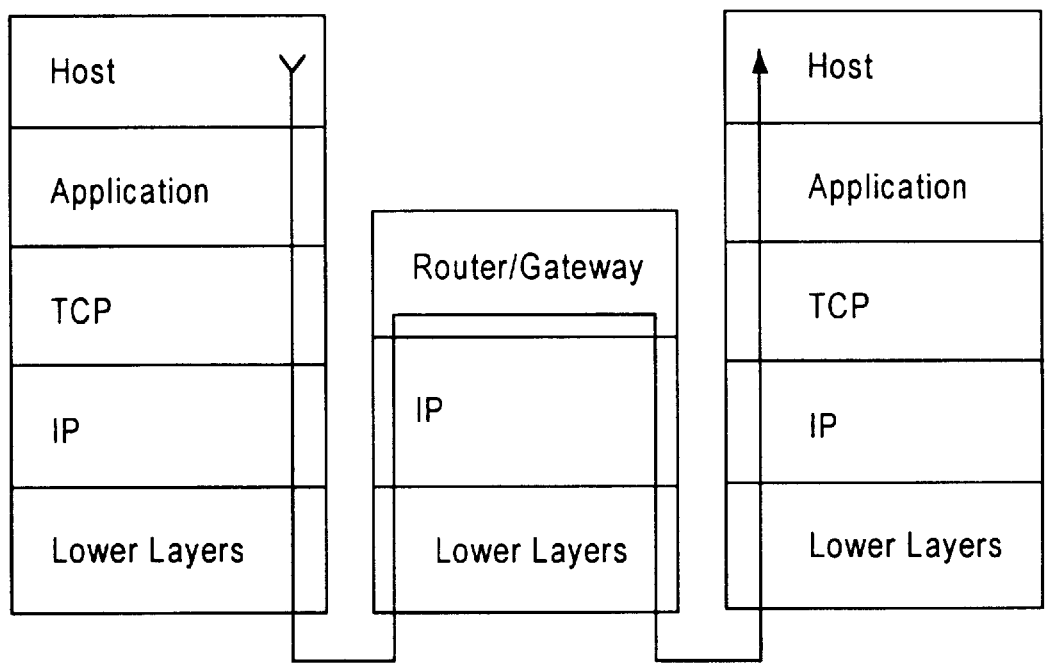
FIG. 3 is a simplified block diagram illustrating the passage of a packet from an initiating host to a receiving host through a gateway.
Figure 4:
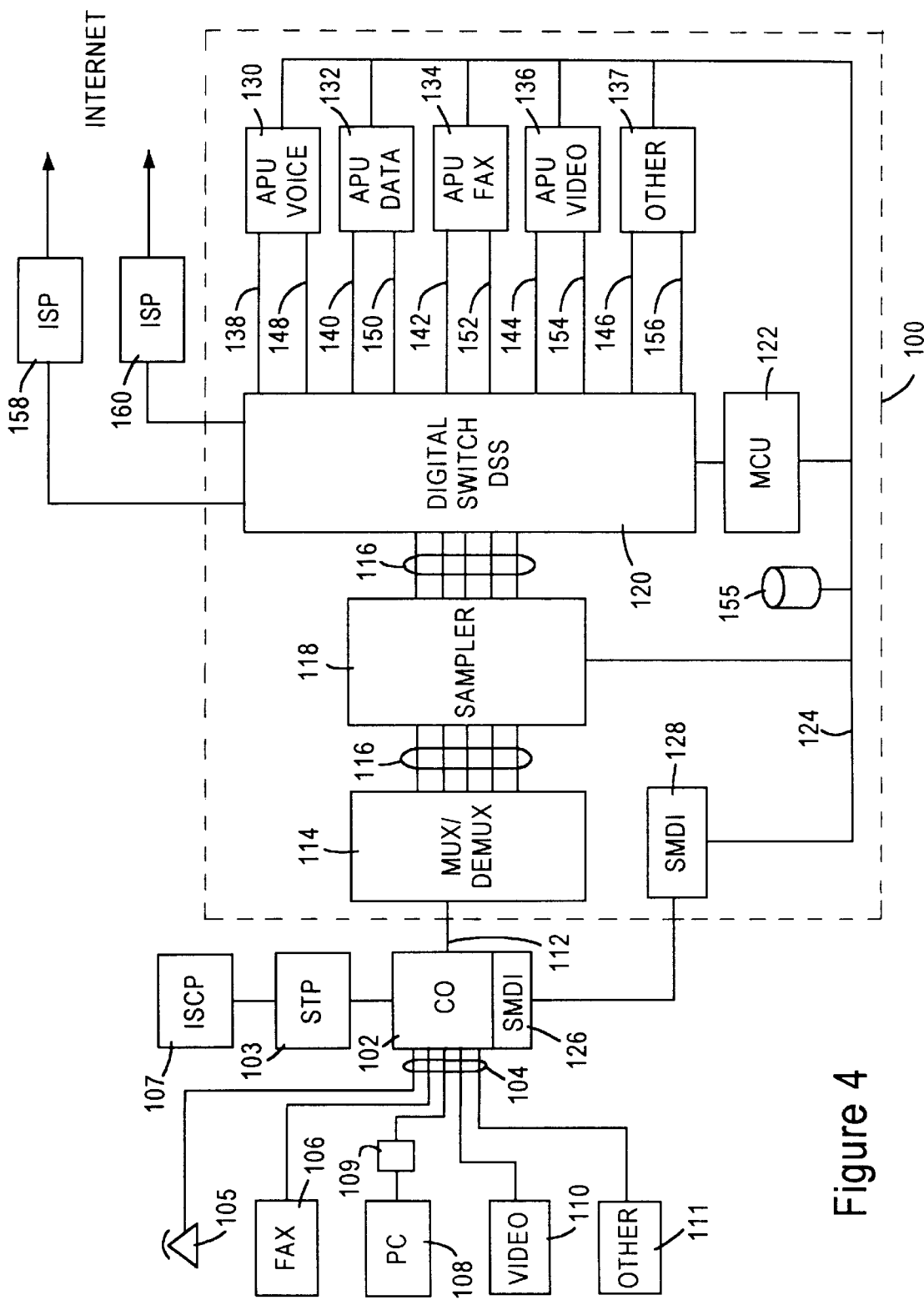
FIG. 4 is a simplified block diagram of a network server constructed according to one embodiment of the invention.
Figure 5A:
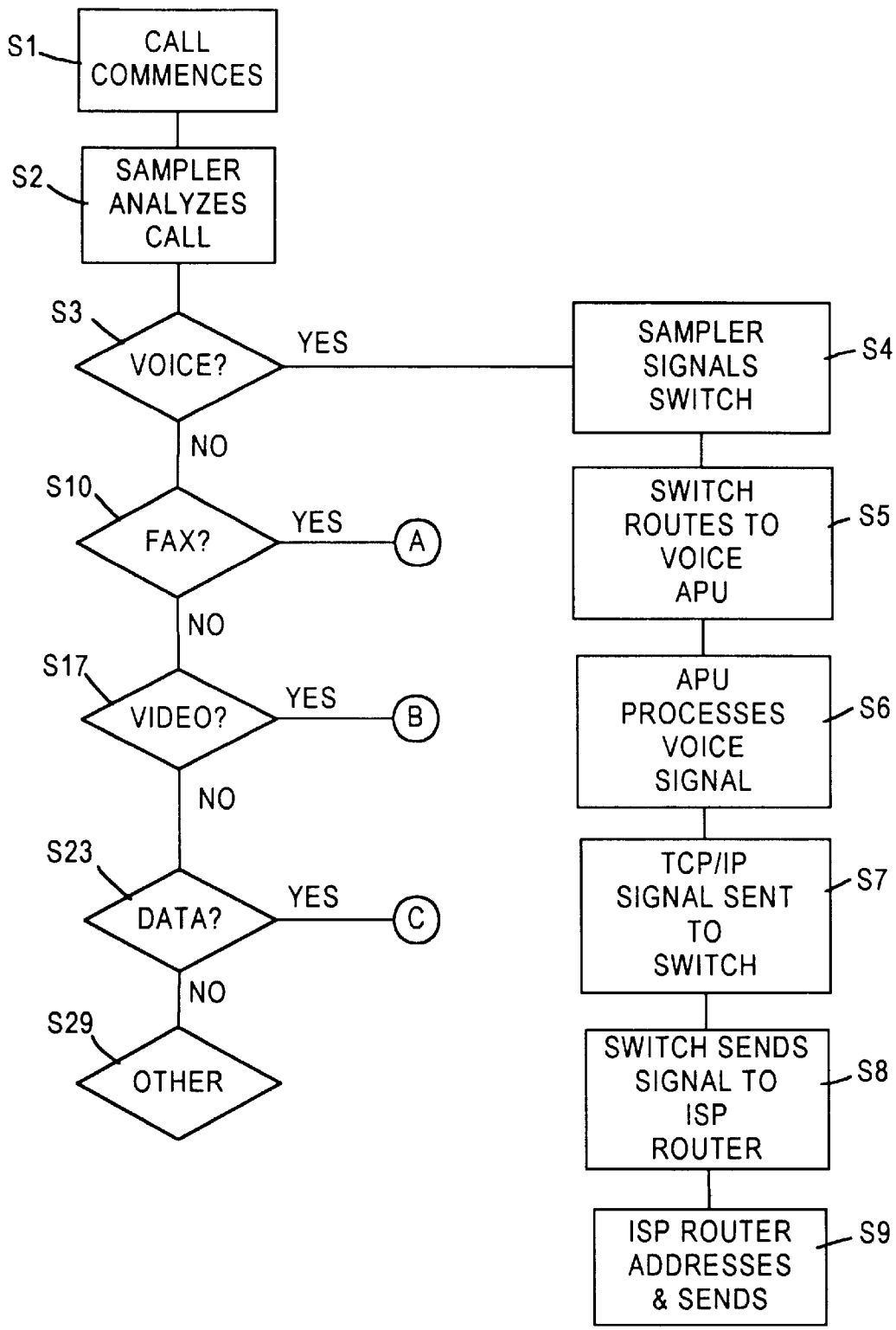
FIGS. 5A, 5B, 5C and 5D constitute flow charts illustrating the operation of the network server of the invention according to one embodiment.
Figure 5B:
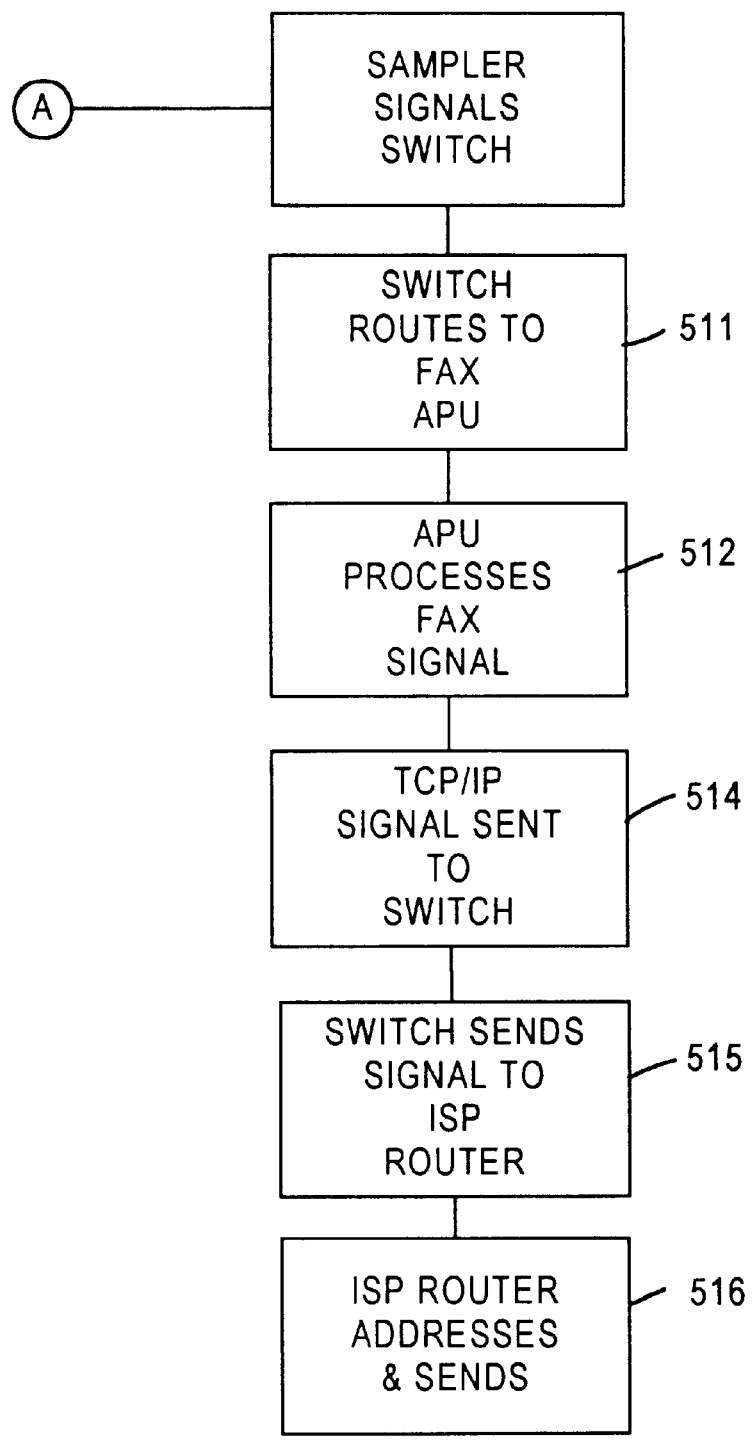
Figure 5C:
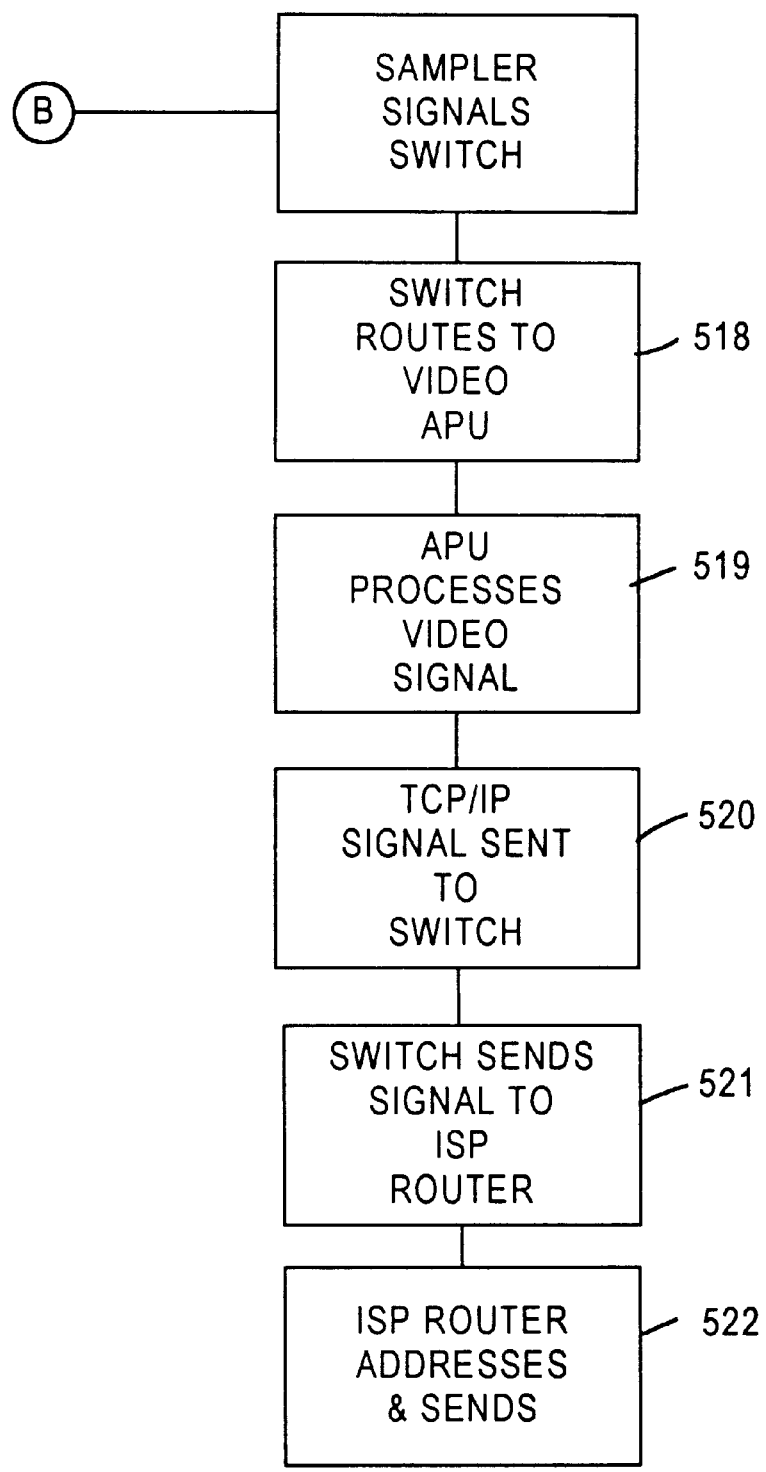
Figure 5D:
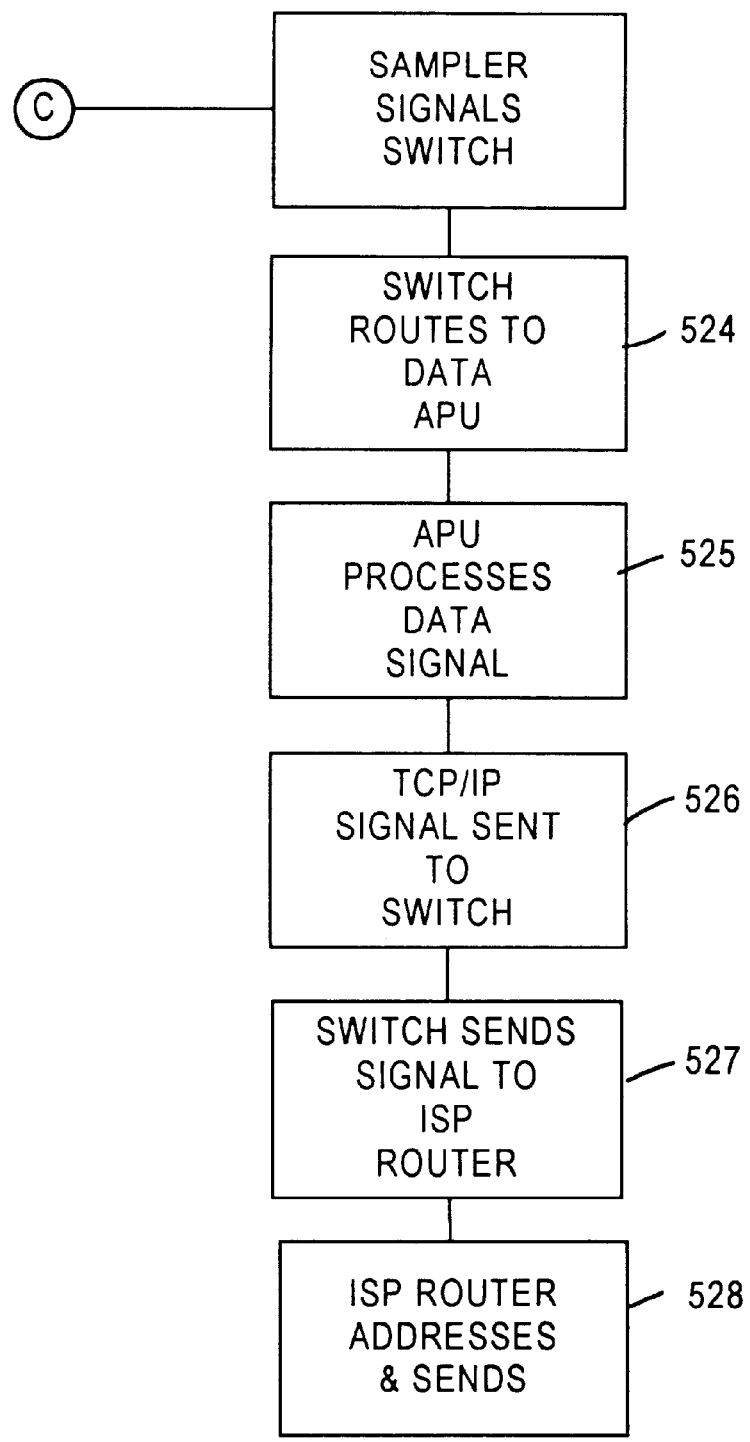

Referring to FIG. 4 there is shown at 100 a preferred embodiment of a network server constructed and connected according to the invention. A central office (CO) 102 connected in a telecommunications network (which is not completely shown), contains a program controlled switching system with service switching point (SSP) capability. The central office is connected to a common channel interoffice switching (CCIS) network indicated by a service transfer point (STP) 103 and a service control point (SCP) or integrated service control point (ISCP) 105. A series of subscribers are connected to the central office 102 by links 104. The subscribers may comprise a POTS (plain old telephone service) subscriber having a POTS telephone 105, a facsimile (FAX) subscriber 106, a subscriber having a personal computer (PC) 108 connected through a modem 109, a video service subscriber 110, and one or more other type subscribers indicated at 111. The links 104 may be copper twisted pair, ISDN, T1 or the like. The central office is connected by a T1 line 112 to the input/output of the network server 100 (shown in broken lines).

The network server input/output interface may include a multiplexer/demultiplexer (MUX/DEMUX) 114, which receives a 1.54 Mbps DS1 (digital service level 1) input on the T1 line 112 from the central office 102. The MUX/DEMUX demodulates or separates out the 24 64 Kbps DS0 signals which were in its DS1 input. These are then passed on to the digital switch DSS 120 on the DS0 lines 116. These lines pass through or are coupled to a passive monitor or sampler 118 which is capable of passively monitoring and reading or identifying the signals on the DS0 lines 116. Devices of this type are known to those skilled in the art and typical examples may be seen in U.S. Pat. No. 4,587,651, issued May 6, 1986, to Gary A. Nelson, et al., U.S. Pat. No. 5,469,500, issued Nov. 21, 1995, to Sohail Satter, et al., and U.S. Pat. No. 5,029,199, issued Jul. 2, 1991, to Scott A. Jones, et al., which patents are incorporated herein by reference in their entirety.

The lines 116 from the monitor or sampler are connected to a digital switch (DSS) 120. The network server 100 is provided with a master control unit (MCU) or central processing unit 122 which is connected to the digital switch DSS 120 and to a LAN (local area network) 124. The local area network may be of any suitable type, such as an Ethernet. The central office has an SMDI (Simplified Message Desk Interface) card which is connected to an SMDI card 128 in the network server 100 in order to provide a signaling link. The SMDI card 128 in the network server is connected to the LAN 124.

The network server 100 is provided with application processing units (APUs) 130, 132, 134, 136, and 137. Each processing unit is designed to process the distinctive form of signal which is delivered to the specific APU or processor. The APUs which are illustrated are shown as being for voice, data, FAX, video, and other. The APUs are connected to the LAN 124 and are also connected to the digital switch DSS 120 by DS0 64 Kbps input lines 138–144, and by output lines 148–154. Each APU is provided with internal buffering storage and the network server may have a common storage 155 which is connected to the LAN 124.

The signals on the output lines 148–154 are preferably in TCP/IP protocol as presently will be explained. The digital switch DSS 120 is further connected to one or more Internet Service Provider (ISP) routers 158 and 160. The ISP routers in turn are connected to the public data internetwork or Internet.

The operation of the network server in its illustrated PSTN—Internet environment is now described according to one preferred embodiment of the invention in connection with the flow diagram of FIG. 5. Referring to FIG. 5A, the process begins at S1 when a call commences after having been originated by one of the stations 105–111. The call may be originated by dialing a pre-assigned 800 number, such as 1-800-INTERNET. This results in TCAP (Transactional Capabilities Application Part) messages in the common channel signaling network in the conventional manner and the actual number of the appropriate network server 100 is ascertained and connected to the central office 102. The number can be usable nationwide to locate the cognizant network server in a manner which is known to those skilled in the art.

At step S2 the monitor or sampler 118 analyzes the call to determine its nature. At step S3 a decision block is reached and it is ascertained whether or not the monitor or sampler has determined that the signal in the line to the digital switch DSS 120 is a voice signal. If such a determination has been made in the affirmative, the monitor or sampler communicates this fact to the switch DSS 120 via the LAN 124 at step S4. The switch in turn routes the signal to the input line 138 of the voice processor APU 130 and to that APU. This is shown at step S5. The voice APU thereupon applies appropriate voice processing to the signal. This may comprise compression, packetizing, and encapsulating in TCP/IP protocol addressing at step S6. The voice APU 130 then forwards the TCP/IP signal over output line 148 back to the switch DSS 120 at S7. The switch recognizes the addressing and sends the packetized TCP/IP signal to the designated ISP router 158 or 160 at step S8. Alternatively the switch DSS may receive handling instructions via the LAN 124. The router performs its customary addressing and routing functions and sends the packet out into the Internet on its first hop. This is shown at step S9.

In this procedure the voice signal is processed in the application processing unit APU 130, which is specifically designed to provide optimum handling to voice signals. No compromises in this processing are necessary, as may be the case if a multipurpose APU were to be used. It has long been recognized that audio signals are extremely time-sensitive. This is due to the fact that users are extremely sensitive to minute tones, inflections and pauses, particularly in human speech. Thus, a computer data network that also must transmit audio data is forced to cope with the communication of both bursty computer and time-sensitive audio data on the backbone. The result is that many transport protocols that are sufficient to transmit data are insufficient for transmission of time-sensitive audio data. The latencies present in a communication network, e.g., those relating to coding, packet assembly, media access, propagation, receiver buffering and decoding, must be precisely compensated for to preserve the fidelity of the audio signal. The present invention makes it possible to provide optimal processing of audio and voice signals without sacrifice of the handling of other data signals.

If the analysis at step S2 resulted in a negative decision at step S3, the process proceeds to the decision at step S10. At step S10 a determination is made as to whether or not the signal is a facsimile or FAX signal. If this decision is affirmative, the DS0 signal is sent by the switch DSS 120 to the FAX application processor unit (APU) 134 in step S11. At step S12 the FAX APU 134 processes the signal to translate the DS0 signal back to the original FAX protocol, i.e., Group X FAX. The X in that expression refers to the generation or sequence in the evolution of FAX technology in which the machine in question operates. The numbers match the age of the technology, Group 1 being the oldest and Group 4 being the newest. Group 3 is the commonest of the FAX machine technologies currently in use. Group 3 FAX machines scan and store images as digital data. Earlier FAX machines used strictly analog scanning techniques. Group 3 machines provide a finer resolution than that of Group 1 or Group 2 FAX machines, as well as higher speeds in scanning and transmitting images. However, while Group 3 machines use digital scanning and storage techniques, they must still transmit image data as analog signals, due to the nature of the voice telephone network. For this reason FAX machines have built in modems.

The FAX APU 134 packetizes, encapsulates, and addresses the FAX signals in TCP/IP protocol. The FAX APU 134 then forwards the TCP/IP signal over output line 152 back to the switch DSS 120 at S14. The switch recognizes the addressing and sends the packetized TCP/IP signal to the designated ISP router 158 or 160 at step S15. The router performs its customary addressing and routing functions and sends the packet out into the Internet on its first hop. This is shown at step S16. In this procedure the voice signal is processed in the application processing unit APU 134 which is specifically designed to provide optimum handling to FAX signals.

If the analysis at step S2 resulted in negative decisions at steps S3 and S10, the process proceeds to the decision at step S17. At this point it is determined whether or not the signal is a video signal. If this decision is affirmative, the DS0 signal is sent by the switch DSS 120 to the video application processor unit 136 in step S18. At step S19 the video APU 136 processes the signal to translate the DS0 signal back to the original MPEG. The video APU 136 packetizes, encapsulates, and addresses the MPEG signals in TCP/IP protocol. The video APU 136 then forwards the TCP/IP signal over output line 154 back to the switch DSS 120 at S20. The switch recognizes the addressing and sends the packetized TCP/IP signal to the designated ISP router 158 or 160 at step S21. The router performs its customary addressing and routing functions and sends the packet out into the Internet, on its first hop. This is shown at step S22. In this procedure the voice signal is processed in the application processing unit APU 136 which is specifically designed to provide optimum handling to video signals.

If the analysis at step S2 resulted in negative decisions at steps S3, S10, and S17, the process proceeds to the decision at step S23. Here it is determined whether or not the signal is a data signal. If this decision is affirmative the DS0 signal is sent by the switch DSS 120 to the data application processor unit 132 in step S24. At step S25 the data APU 132 processes the signal to translate the DS0 signal back to the original data signal. The data APU 132 packetizes, encapsulates, and addresses the data signals in TCP/IP protocol. The data APU 132 then forwards the TCP/IP signal over output line 150 back to the switch DSS 120 at S26. The switch recognizes the addressing and sends the packetized TCP/IP signal to the designated ISP router 158 or 160 at step S27. The router performs its customary addressing and routing functions and sends the packet out into the Internet on its first hop. This is shown at step S28. In this procedure the voice signal is processed in the application processing unit APU 136 which is specifically designed to provide optimum handling to data signals.

If the analysis at step S2 resulted in negative decisions at steps S3, S10, S17, and S23, the process proceeds to the decision at step S29. At this point it is determined whether or not the signal is yet another protocol. If the response here is affirmative and the monitor or sampler recognizes the protocol, the signal is sent by the switch DSS to the other application processing unit APU 137. This unit is illustrated to show that the system and method of the invention are dynamic and readily susceptible to the addition of new APUs as the technology evolves. Yet another possibility exists, and that is that the sampled signal is already a TCP/IP protocol signal. In this event the monitor or sampler signals the switch to this effect and the signal is passed through the switch DSS direct to the cognizant ISP router 158 or 160.

It will be appreciated by those skilled in the art that telephony calls via the Internet under current conditions generally are unable to take advantage of the common channel signaling system that presently exists over most if not all of the United States. This results in non-standardized and cumbersome call set up that frequently requires making prior arrangements with the called party in order that the essential equipment is operating and attended at the called and calling stations. Indeed, many telephony contacts made over the Internet today have many of the attributes of radio communication by pre-arranged schedule.

Figure 6:
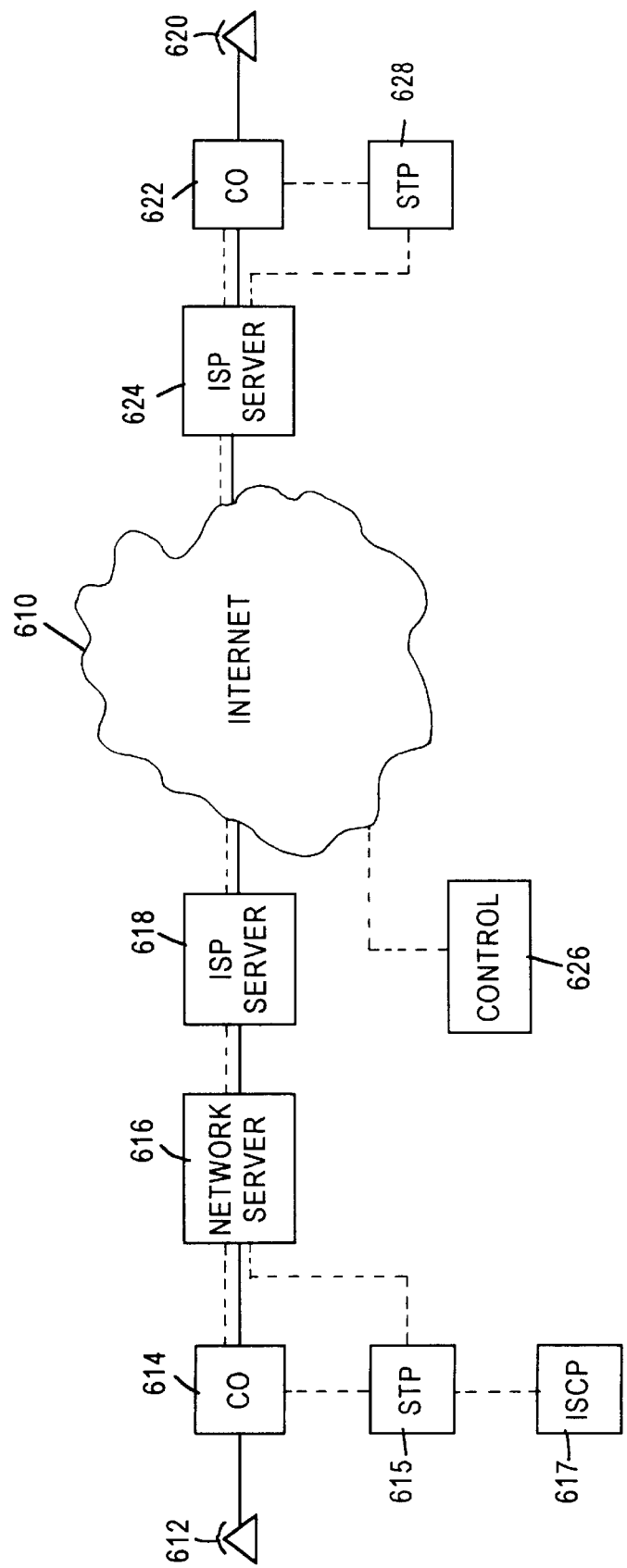
FIG. 6 is a simplified block diagram of another embodiment of the invention illustrating improved call completion pursuant to this embodiment.

It is a feature of the present invention that such disadvantages may be obviated to provide a quality of service approaching that available through the use of the public switched telephone network. FIG. 6 shows a simplified block diagram of a combination PSTN/Internet network through which such an improved telephony service may be attained.

While the telecommunications network illustrated at the left of FIG. 4 shows a telephone system equipped with common channel interoffice signaling (CCIS) and an Advanced Intelligent Network (AIN), the end to end communication link is completed through the public packet data network or Internet. As a result, classic end to end CCIS and AIN signaling if not available. This problem may be solved according to the present invention by utilizing a signaling system which may be termed "virtual AIN". Such a system is described in the common assignee's copending application Ser. No. 08/710,594, attorney docket number 680-188, filed Sep. 20, 1996, which application is incorporated herein by reference in its entirety.

Referring to FIG. 6, the public packet data network, which may be the Internet, is shown as a cloud at 610. Connected to that network at the left is an internetwork access system such as that shown and described above in connection with FIGS. 4 and 5. By way of example, the system is illustrated in terms of a telephone voice call, although it will be appreciated by those skilled in the art that the system may also be utilized in implementing the other types of communication discussed above in relation to FIGS. 4 and 5.

FIG. 6 shows a telephone station 612 connected to an SSP capable central office switching system 614. The central office 614 in turn is connected to a network server 616 of the type just described. As in FIG. 4, the network server delivers its output and receives its input to and from an ISP router 618. The ISP router in turn is connected to the packet data internetwork or Internet 610. All connections between the central office, network server, ISP router, and the packet data internetwork include communication signal links shown as solid lines, while signaling links are shown as broken lines. It will be realized that in practice these may constitute the same physical links.

At the right hand side of FIG. 6 there is shown the remote, called or destination telephone station 620 connected to the destination central office switching system 622. The destination central office 622 is connected to the public packet data internetwork through an ISP router 624. A network server of the type disclosed in this application may or may not be available between the central office 622 and the ISP router 624. The network comprising the central office 622 and ISP router 624 are provided with network control signaling represented by the broken lines. This signaling may or may not be common channel signaling, although common channel signaling is preferred and SS7 signaling is assumed in this illustrative example. An example of the operation of the system shown in FIG. 6 is now described.

When the calling party at the originating telephone station 612 dials the number 1-800-INTERNET, and subsequently dials the number of the desired called party, such as the destination telephone station 620, the originating central office 614 and its SSP recognize the call as an Internet call. The originating central office switching system suspends the call, formulates an SS7 packet message, and sends the message to the nearest STP 615. The STP analyzes the point code information in the packet and routes the packet according to the translation table stored within the STP. That translation table recognizes the Internet prefix as one requiring modified common channel signal handling and directs the SS7 packet to the network server 616 for transmission over an Internet route. The network server and ISP router 618 perform the necessary address determination from the information in the packet, add the appropriate addressing and instructional overhead to encapsulate the packet in one or more TCP/IP packets, and transmit the SS7 packet or packets on to the Internet as previously described.

The destination ISP router 624 will perform its TCP/IP function, strip the overhead, reform the original SS7 packet and deliver it to the SS7 capable control network of the destination telephone system. That network operates in its designed manner to send the message via the remote SS7 network to the end switching office that serves the destination telephone line. This constitutes the terminating central office switching system 622 in the illustrated example.

The terminating central office 622 determines whether or not the called station 620 is off-hook or busy. If the called station is busy, the terminating central office 622 so informs the originating central office 620. It accomplishes this via SS7 signaling in the remote telephony network through its CCIS control network, followed by TCP/IP signaling through the Internet, and SS7 signaling in the originating switching system. The originating central office 620 provides a busy signal to the calling station 612.

If the called station 620 is not busy, the terminating central office 622 so informs the originating central office. A telephone connection is then constructed via the trunks, switching offices, and Internet link between the calling and called stations.

While the illustrative call did not require a higher level of control than that available from the STP, the system is capable of providing service features which require centralized program control from a higher level control point. Such control may be obtained according to the invention either from the ISCP which controls the CCIS network of the originating telephone network or, alternatively, from a central control such as the controller 626 connected to the Internet. Such a controller may emulate the actions of an ISCP as described.

The hybrid network shown in FIG. 6 may be used in a still different manner according to a further embodiment of the invention. According to this mode of operation it is possible to virtually eliminate the need for reliance on the CCIS network of the originating telephone network. As previously described, the originating and terminating central office switches 614 and 622 are both SSP capable and thus include service switching points. In the embodiment now described the data link for signaling purposes (shown as broken lines in the previous description) is established directly from the SSP in the originating central office 614 through the ISP router 618 to the Internet. The same is true at the destination central office 622.

In operation the caller dials the number of the called station complete using the Internet prefix number. The SSP in the originating central office 614, programmed to recognize predetermined prefix as an action trigger, momentarily suspends processing of the call and formulates a message to be sent to the network server 616. The message content and format is similar to that of the message sent from the STP 615 to the server 616 in the embodiment of the invention just described. It will include the numbers of the called and calling parties. It will also include an indication of the Internet call type. In this case it will indicate that the call is placed to a predesignated prefix and is to be handled via Internet control signaling. This provides the network server with an indication of the treatment the call is to receive. The network server thereupon processes the message in the manner described in detail in connection with the previously discussed mode of operation of the hybrid network shown in FIG. 6. If the called party is available a voice connection is set up. If the called line is busy, a busy signal is provided to the calling party from the originating central office.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A server, comprising:
    a first interface for coupling the server to the Internet using packet addresses defined in a first protocol;
    a second interface for connecting the server to a public switched telephone (PSTN) network via a telephone link capable of selectively transporting at least two signals defined respectively in two protocols different from one another and different from said first protocol, one of said two protocols comprising a voice signal protocol;
    two application processing units for processing respectively said two transported signals;
    a switch coupling said second interface to said two application processing units;
    a central processing unit coupled to said second interface, said switch, and said two application processing units;
    software running on the central processing unit for processing information received from said second interface to generate control signals for said switch, wherein:
    a) the software controls the central processing unit to deliver to said switch control signals directing the delivery by said switch to one of said two processing units one of said two transported signals, and to deliver to the other of said two application processing units the other of said two transported signals; and
    b) said two transported signals are stripped respectively of said two protocols which are different from said first protocol, processed in said respective application processing units, delivered to said first interface and provided with packet addresses according to said first protocol.

2. A server according to claim 1, wherein said second interface includes a passive monitor that is coupled to said telephone link and coupled to said central processing unit.

3. A server according to claim 2, wherein said telephone link is connected to a terminating program controlled switching system in said PSTN network.

4. A server according to claim 3 wherein said signals carried by said link include a DS1 (digital service, level 1) signal.

5. A server according to claim 4 including a demultiplexer coupling said terminating program controlled switching system to said switch.

6. A server according to claim 5 wherein said demultiplexer delivers to said switch DS0 (digital service, level 0) signals.

7. A server according to claim 6 wherein said central processing unit is coupled to said switch, said monitor, and said application processing units by a local area network (LAN) which is connected to a control signaling system for said PSTN network.

8. A server according to claim 1 wherein said first interface includes an Internet Service Provider (ISP) router.

9. A server according to claim 8 wherein said Internet Service Provider router is connected to said switch.

10. A server according to claim 9 wherein said switch delivers to said Internet Service Provider router signals in TCP/IP (transmission control protocol/Internet protocol) format.

11. A server according to claim 10 wherein said application processing units deliver to said switch signals in TCP/IP (transmission control protocol/Internet protocol) format.

12. A server according to claim 11 wherein said switch delivers to said application processing units signals in DS0 (digital service, level 0) format.

13. A server according to claim 12, wherein one of said DS0 (digital service, level 0) format signals carries a facsimile (FAX) signal.

14. A server according to claim 12, wherein one of said DS0 (digital service, level 0) format signals carries a video signal.

15. A server according to claim 12, wherein one of said DS0 (digital service, level 0) format signals carries a data signal.

16. A server according to claim 12, wherein one of said DS0 (digital service, level 0) format signals carries an audio signal, and said first interface carries a call set up signal for establishing a telephony communication link between a calling telephone station and a called telephone station though said server and the Internet.

17. A method for accessing a public system of interlinked packet data networks using packet addresses defined in a first protocol with multiple signals of differing protocols from a public switched telephone (PSTN) network comprising the steps of:
    delivering from said PSTN network to an integrated server a digital time division multiplexed signal comprising said multiple signals of differing protocols;
    analyzing each of said multiple signals of differing protocols delivered to said integrated server to determine the protocol thereof;
    switching each of said multiple signals of differing protocols which were analyzed in said analyzing step to a specialized application processing unit selected on the basis of the protocol determined in said analyzing step;
    processing each of said multiple signals of differing protocols in said specialized processing units pursuant to processing methodology tailored to the determined protocol of the signal being processed;

translating the protocols of each of said multiple signals of differing protocols to said first protocol; and delivering said processed and translated signals to said public system of interlinked packet data networks using packet addresses defined in said first protocol.

18. A method according to claim 17, wherein said analyzing step comprises demultiplexing said digital time division multiplexed signal into component demultiplexed signals and and analyzing each of said demultiplexed signals.

19. A method according to claim 18 wherein said demultiplexed signals are DS0 (digital service, level 0) signals.

20. A method according to claim 19 wherein said digital time division multiplexed signal is a DS1 (digital service, level 1) signal.

21. A method according to claim 18, wherein said step of delivering processed and translated signals comprises outputting from each of said specialized application processing units a processed signal, and switching said processed signals to a router which provides said packet addresses defined in said first protocol.

22. A method according to claim 21 wherein said first protocol is TCP/IP (transmission control protocol/Internet protocol).

23. A method according to claim 22 wherein said public system of interlinked packet data networks comprises the Internet.

24. A method for accessing a public system of interlinked packet data networks using packet addresses defined in a first protocol with multiple signals of protocols differing from said first protocol via a switching system in a public switched telephone (PSTN) network comprising the steps of:

delivering from said switching system to an integrated server synchronous digital time division multiplexed signals containing said multiple signals of differing protocols, at least one of the protocols of said multiple signals comprising a voice signal protocol;

identifying each of said multiple signals delivered to said integrated server;

based on the identity of said multiple signals obtained in said identifying step, switching said signals individually to different respective application processing units;

processing each of said multiple signals in said respective application processing units pursuant to differing processing methodology depending on the identity of the signal being processed;

translating the protocols of each of said multiple signals to said first protocol; and delivering said processed and translated signals to said public system of interlinked packet data networks using packet addresses defined in said first protocol.

25. A method according to claim 24, wherein said step of identifying comprises demultiplexing said synchronous digital time division multiplexed signals containing said multiple signals and identifying each of the demultiplexed signals.

26. A method according to claim 24, wherein said step of delivering processed and translated signals comprises outputting from each of said application processing units a processed signal, and switching said processed signals to a router which provides said packet addresses defined in said first protocol.

27. A method according to claim 26 wherein said first protocol is TCP/IP (transmission control protocol/Internet protocol).

28. A method according to claim 27, wherein said public system of interlinked packet data networks using packet addresses defined in a first protocol comprises the Internet.

29. A method of establishing communication from a calling telephone network subscriber station through a hybrid combination of networks including public switched telephone networks having switching systems connected by trunks and control systems for communication path establishment through said telephone networks, and a public internetwork of interlinked packet data networks using packet addresses defined in a first protocol, comprising the steps of:

transmitting from said calling subscriber station to a first of said switching systems a call initiation request message including characters signaling a request for communication through said hybrid combination of networks and identification of a called station;

initiating, from said first of said switching systems via said control systems and said public internetwork two-way control messages establishing the availability of said called station;

upon establishing the availability of said called station, delivering from one of said switching systems, to an integrated server, synchronous digital time division multiplexed signals containing a signal from said calling subscriber station having a second protocol;

identifying said second protocol delivered to said integrated server;

based on the identity of said second protocol, switching said signal from said calling subscriber station to an application processing unit of a type determined by said second protocol;

processing said signal from said calling subscriber station in said application processing unit pursuant to a processing methodology depending on said second protocol;

translating said second protocol of said signal from said calling subscriber station to said first protocol; and delivering said processed and translated signal to said public system of interlinked packet data networks using packet addresses defined in said first protocol.

30. A method according to claim 29 wherein said control systems are common channel interoffice signaling (CCIS) systems.

31. A method according to claim 30 wherein said common channel interoffice systems comprise signaling system 7 (SS7).

32. A method according to claim 29 wherein said first protocol is TCP/IP (transmission control protocol/Internet protocol).

33. A method according to claim 32 wherein said system of interlinked packet data networks using packet addresses defined in a first protocol comprises the Internet.

* * * * *